United States Patent [19]
Schneider et al.

[11] Patent Number: 5,820,303
[45] Date of Patent: Oct. 13, 1998

[54] EXCAVATION PIT LINING AND METHOD FOR ITS PRODUCTION

[75] Inventors: Günter Schneider, Oestrich; Ulrich Kühner, Mannhein, both of Germany

[73] Assignee: Dyckerhoff AG, Wiesbaden, Germany

[21] Appl. No.: 683,619

[22] Filed: Jul. 17, 1996

[30] Foreign Application Priority Data

Jul. 19, 1995 [DE] Germany ............... 195 26 396.0

[51] Int. Cl.⁶ .................................................. E02D 5/18
[52] U.S. Cl. ........................ 405/267; 405/239; 405/266
[58] Field of Search ........................... 105/107, 150.2, 105/233, 239, 266, 267, 286, 287

[56] References Cited

U.S. PATENT DOCUMENTS

| | | | |
|---|---|---|---|
| Re. 33,747 | 11/1991 | Hartley et al. | 405/266 |
| 3,645,101 | 2/1972 | Sherard | 405/267 |
| 4,266,885 | 5/1981 | Naito et al. | 405/267 X |
| 4,639,168 | 1/1987 | Wietek | 405/239 |
| 4,844,662 | 7/1989 | Kallinich et al. | 405/267 X |
| 5,022,792 | 6/1991 | Konno et al. | 405/267 |

FOREIGN PATENT DOCUMENTS

| | | |
|---|---|---|
| 2 516 113 | 1/1983 | France . |
| 3629 769 | 3/1987 | Germany . |
| 40 13 801 | 11/1991 | Germany . |
| WO 80/01582 | 8/1980 | WIPO . |

OTHER PUBLICATIONS

Tiefbau Apr. 1994, pp. 208–217.

*Primary Examiner*—George A. Suchfield
*Attorney, Agent, or Firm*—Jones & Askew

[57] ABSTRACT

The invention pertains to an excavation pit lining consisting of a slit wall of a hardening single-phase slit wall material with an exposed surface on the pit side, and also of vertical support elements placed at a distance in the single-phase slit wall material, whereby the slit wall forms a panel wall between the support elements and where the single-phase slit wall material has at least one water-retentive, lightweight aggregate.

28 Claims, 1 Drawing Sheet

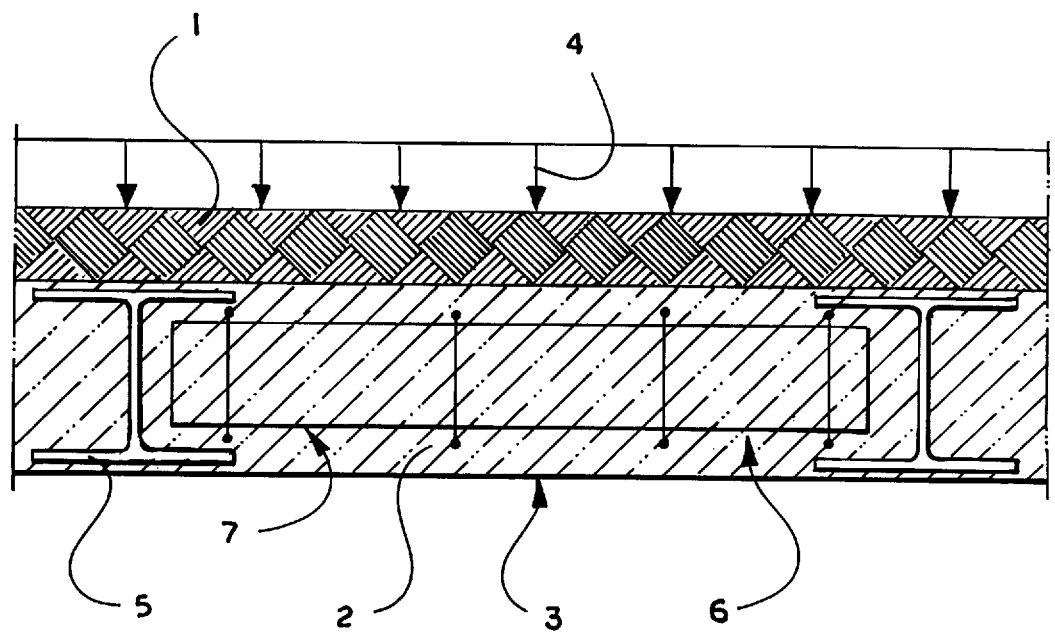

EXCAVATION PIT LINING AND METHOD FOR ITS PRODUCTION

FIELD OF INVENTION

The invention pertains to an excavation pit lining for securing an excavation pit in the ground water region and above the ground water level as well as to a method for its production and to a construction material mixture for it.

BACKGROUND OF INVENTION

At present—in addition to other techniques, e.g. bore diaphragm lining—four basically different excavation pit linings are known, namely sheet pile lining, support plank wall lining, slit wall lining and combinations of these linings.

The invention pertains to a combination that uses a slit wall.

In this regard there have been attempts in the production of excavation pit linings to let down sealing walls in a single-phase slit wall lining, into which supporting elements, such as I-beam section supports then were set vertically. In this case, the slit wall material acts as a gap filler. As construction material, a conventional single phase impermeable diaphragm, e.g., in the form of a finished, dry mixture, is used.

After preparation of the slit wall, e.g., down to the bottom of the excavation, and after hardening of the construction material, the excavation pit was excavated, where the slit wall is exposed on one surface, e.g., on the air side. The single-phase material should ensure a sealing of the excavation pit against the penetration of water. The forces resulting from the water pressure and ground pressure are to be absorbed by the supporting elements, e.g., the I-beam section supports and the single-phase material acting as panel wall, as well as possibly by additional strengthening elements or compression anchors or other reinforcing elements.

The application of this known excavation pit lining combination includes the advantage that they are free of vibrations and can be prepared with relatively simple means, and requires few machines, thus saving space. But it turns out that the supporting properties of the single-phase material are not sufficient and the sealing and supporting properties of the single-phase material are lost relatively quickly during the construction phase. Uncontrolled crack formation and/or material chipping occurs until ultimate collapse of one wall, as a rule in a period in which the structure is not yet completed and the excavated pit wall is intended to perform its function unimpaired. For this reason, the known combination method—even though it is superior to all other methods both in cost and in production engineering—has not been used practically.

SUMMARY OF INVENTION

It is the purpose of the invention to create a single-phase slit wall for the aforementioned excavation pit lining combination, so that after excavation of the pit and after exposing its surface on the excavation pit side, the slit wall will remain open, unchanged and watertight, and its role as a supporting or static acting element is retained for as long as the construction pit is left open, whereby its supporting property is to be increased compared to conventional materials.

According to the invention, a single phase slit wall material is used that contains a porous, lightweight aggregate; during the hardening phase of the construction material in which the construction material chemically and adsorptively binds water, this aggregate retains additional water and stores it long term, so that after excavation of the pit the construction material remains nearly unchanged, in particular at the exposed slit wall surface, based on the water stored in the interior of the compound. The lightweight aggregate also increases the elasticity of the wall material and thus counteracts the formation of cracks.

It is surprising that the watertightness of the slit wall can be inherently ensured, even though porous, water-permeable lightweight aggregates are used. Evidently, fine-particulate slit wall material penetrates the pores of the grains of the lightweight aggregate, so that a kind of anchoring results which blocks the water paths and also increases the shear strength of the material and thus its supporting action. Chiefly, however, this means that the strength of the hardening material is retained, so that even at high temperature or even in an extreme temperature change, no change leading to breakup will occur. It is also an advantage that the invented excavation pit lining can be used in winter, because the material is freeze-resistant. Thus, according to the invention it is possible to provide a single-phase slit wall material that can be used for excavation pit lining, which satisfies all requirements in an optimum manner during the construction phase of e.g., three to twelve months.

Thus the inherently known combination method can now be used for the first time without any risk. Use of the material ensuring the favorable properties, namely of the lightweight aggregates, is basically not recommended for slit wall sealing materials, which as a rule, must be watertight for a very long term. Porous, lightweight aggregates are "toxins" in such materials, because they guarantee the opposite, namely water mobility. In excavation pit lining, the watertightness of the single-phase material according to this invention, surprisingly persists for a sufficient length of time so that watertight and strong slit walls can be provided for the planned construction phase.

The single-phase material can ensure a sealing of the construction pit against ground water, even underneath the base of the excavation pit, when the slit wall is set down underneath the base of the excavation pit.

The forces of water pressure and ground pressure are absorbed by the supporting elements, e.g., the I-beam girders and the panel wall in between, namely the hardening single-phase material. If necessary, additional strengthening elements, such as belts, strips and/or compressed anchors, can be used. It is also possible to install reinforcing elements, such as reinforcing steel cages or similar items. The sealing and supporting properties of the single-phase material will not be lost during the construction phase, because the material will not dry out, it can withstand temperature fluctuations without change, e.g., without crack formation, and is freeze-resistant.

BRIEF DESCRIPTION OF DRAWING

Based on the FIGURE, the invention will be explained in greater detail in the following example. The sole FIGURE shows schematically a top view of a cross section of a portion of an excavation pit lining according to a preferred embodiment of the invention.

DESCRIPTION OF PREFERRED EMBODIMENT

The ground 1 is reinforced by a hardening single phase slit wall 2 whose air-side or pit-side surface 3 is exposed. The ground pressure and water pressure are symbolized by the arrows 4. In the single-phase slit wall 2, the I-beam girders 5 are shown vertically at a certain distance. The single-phase material located between the supports 5 acts as a panel wall 6. Furthermore, reinforcing elements can be installed in the panel wall 6, e.g., in the form of reinforcing steel cages 7.

According to this invention, a slit is produced according to known slit wall methods, where a material is used as single-phase material which acts as a support after hardening, where said material acts as a panel wall or performs a similar function and can absorb ground pressure and water pressure, in particular in combination with other supporting elements.

A particularly suitable mixture of construction material for the single phase compound consists of the following components:
- cement (Portland cement, blast furnace cement or similar material)
- metallurgical slag
- crushed rock
- clay component (Bentonite, kaolinitic clays or similar material)
- lightweight aggregate
- zeolite or zeolitic vulcanite.

These constituents are then mixed preferably in the following quantities, where the data pertains to percent by weight [wt %]:
- cement: 10 to 30, preferably 15 to 20 wt %
- metallurgical slag: 40 to 80, preferably 50 to 70 wt %
- crushed rock: 5 to 20, preferably 10 to 15 wt %
- clay component: 2 to 10, preferably 3 to 8 wt %
- lightweight aggregate: 2 to 20, preferably 3 to 10 wt %
- also suitable are zeolite or zeolitic vulcanite: 2 to 10, preferably 3 to 8 wt %.

In any formulation of the composition, it is preferable to achieve a cylindrical compression strength after 28 days (with reference to DIN 1045: Rated strength for B5) of the hardened single-phase material of $\geq 5$ N/mm$^2$. Preferably compression strengths between 10 and 40 N/mm$^2$ are used. The processability of the fresh single-phase material should persist for about 8 h at an immediate Marsh time of 35 to 40 sec.

The porous lightweight aggregate must be capable of storing or retaining water in the hardened single-phase material, even at relatively high temperatures, so that thus crack formation due to drying out will be prevented; on the other hand, the lightweight aggregate must also provide sufficient air pores so that freeze resistance of the hardened single-phase material will also be assured. Finally, the lightweight aggregate must also ensure that the hardened single-phase material will remain sufficiently shear-resistant and elastic, so that movements can be handled without crack formation. Lightweight aggregate materials characterized by high water-storage capabilities such as perlite, vermiculite, pumice, stone chips, and foam mortar granules, are particularly suitable. The lightweight aggregate may also contain blown vermiculite, aerated concrete granulate, or paper fibers.

Mineral, porous, lightweight aggregates with bulk weights from 50 to 1100 kg/m$^3$ and preferably with a stepped, grain distribution analogous to concrete are used.

It is particularly advantageous when the single-phase material is fiber-reinforced, so that its strength, in particular, its ductility or shear strength, is increased. Metallic and/or organic and/or mineral fibers can be used in quantities of 0.4 to 3, preferably from 0.7 to 2, with a length of 6 to 50, preferably from 10 to 30 mm.

In combination with the addition of porous, lightweight aggregates, the supporting, not-yet-hardened single-phase material can also contain at least one inorganic additive, acting hygroscopically or at least one inorganic additive that forms hygroscopic features in the single-phase material, so that the water retention will be further increased. For example, in this regard it is advantageous to introduce the material into the supporting single-phase material in the last phase of the excavation, e.g., by means of the grabbing bucket, and to mix it with the bucket with the single-phase material. For example, magnesium chloride can be used in quantities of 0.01 to 5 wt %. The magnesium chloride accelerates the hardening of the single-phase material and behaves hygroscopically in the hardening material. Likewise, sodium chloride plus calcium hydroxide can be used. These substances form calcium chloride in the single-phase material, which has a highly hygroscopic behavior.

The inorganic additives are used in quantities of 0.01 to 10 wt %, in particular in quantities of 0.05 to 2.

In combination with or alternative to the described inorganic additives, organic additives can also be used to increase the water retention capacity of the single-phase material, such as, cellulose ethers in quantities of 0.01 to 0.2, preferably from 0.05 to 0.1. Provided the agents acting hygroscopically affect the hardening of the single-phase material, it is useful to introduce the agent only at the final phase of the excavation, as described above. If the agents, such as methyl celluloses, have no effect on the hardening of the single-phase material, then the agents can be a constituent of a dry mixture used for production of the single-phase material or an already compounded single-phase suspension.

The excavation pit lining according to this invention remains nearly unchanged during the construction phase; the single-phase material does not dry out, does not run off, will not crack, and is freeze-resistant. Thus with this invention an excavation pit lining is created that is easy to produce; that is, it can be created without harmful shaking, is space-saving and time-saving. In addition, it requires little construction material, is watertight for a sufficient time, and can be equipped with various reinforcement.

What is claimed is:

1. Excavation pit lining comprising a slit wall (2) of a hardening single-phase slit wall material with an exposed surface (3) on the pit side, and vertical support elements (5) placed at a distance in the single phase slit wall material, whereby the slit wall (2) forms a panel wall (6) between the support elements (5) and where the single phase slit wall material has at least one water-retentive, lightweight aggregate.

2. Excavation pit lining according to claim 1, characterized in that the lightweight aggregate is a mineral, porous lightweight aggregate.

3. Excavation pit lining according to claim 2, characterized in that the lightweight aggregate is present in quantities from 2 to 20 wt % in the slit wall material.

4. Excavation pit lining according to claim 3, characterized in that the lightweight aggregate is present in quantities from 3 to 10 wt % in the slit wall material.

5. Excavation pit lining according to claim 2, characterized in that the lightweight aggregate has a bulk weight of 0.05 to 1.1 kg/l.

6. Excavation pit lining according to claim 2, characterized in that the lightweight aggregate has a concrete-like, stepped grain distribution.

7. Excavation pit lining according to claim 2, characterized in that the lightweight aggregate contains blown vermiculite.

8. Excavation pit lining according to claim 2, characterized in that the lightweight aggregate contains aerated concrete granulate.

9. Excavation pit lining according to claim 8, characterized in that the lightweight aggregate contains paper fibers.

10. Excavation pit lining according to claim 1, characterized in that the single phase slit wall material is fiber-reinforced.

11. Excavation pit lining according to claim 10, characterized in that the fibers have a length of 6 to 50 mm, and are present in quantities from 0.4 to 3 wt % relative to the dry substance.

12. Excavation pit lining according to claim 10 characterized in that the fibers are metal fibers.

13. Excavation pit lining according to claim 1, characterized in that the single phase slit wall material contains a hygroscopic salt in quantities of 0.01 to 10 wt %.

14. Excavation pit lining according to claim 13, characterized in that the hygroscopic salt comprises magnesium chloride.

15. Excavation pit lining according to claim 13, characterized in that the hygroscopic salt comprises calcium chloride.

16. Excavation pit lining according to claim 1, characterized in that the single-phase slit wall material contains at least one organic substance to increase the water retention capacity in quantities of 0.01 to 0.2.

17. Excavation pit lining according to claim 16, characterized in that it contains a substance based on methyl cellulose.

18. Excavation pit lining according to claim 1, characterized in that the support elements are I-beam supports (5).

19. Excavation pit lining according to claim 1, characterized in that known reinforcing means are located in the panel wall region (6).

20. Excavation pit lining according to claim 19, characterized in that the reinforcing means are known reinforcing steel cages (7).

21. Method for production of an excavation pit lining according to claim 1, comprising the steps of:

producing a slit wall by use of a single-phase support suspensions installing support elements at intervals in the support suspension; and after hardening of the support suspension, exposing a surface of the slit wall on the excavation pit side, where a single-phase slit wall suspension is used that contains a lightweight aggregate selected from the group consisting of porous mineral material, a lightweight aggregate having a concrete-like stepped grain distribution, blown vermiculite, cellular expanded concrete granulate, and paper fibers.

22. Method according to claim 21, characterized in that the slit wall suspension contains the following constituents, relative to the dry material in percent by weight:

cement: 10 to 30 wt % ground fly ash: 40 to 80 wt % powdered rock: 5 to 20 wt % clay components: 2 to 10 wt % structural light-weight aggregates: 2 to 20 wt % also suitable are zeolites or zeolitic vulcanite: 2 to 10 wt %.

23. Method according to claim 21, characterized in that a fiber-reinforced support suspension is used that contains metal fibers.

24. Method according to claim 21, characterized in that in the final phase of excavation, a hygroscopic material selected from the group consisting of magnesium chloride, calcium chloride, an organic substance to increase water retention capacity, and a substance based on methyl cellulose is mixed in.

25. The excavation pit lining according to claim 11, wherein the fibers have a length of from 10 to 30 mm and are present in quantities of 0.7 to 2 wt %.

26. The excavation pit lining according to claim 13, wherein the hygroscopic salt is present in quantities of 0.05 to 2 wt %.

27. The excavation pit lining according to claim 16, wherein at least one organic substance is present in quantities of 0.05 to 0.1

28. The method according to claim 22, wherein the slit wall contains the following constituents, relative to the dry material, in percent by weight:

cement, 15 to 20 wt %, ground fly ash, 50 to 70 wt %, powdered rock, 10 to 15 wt %, clay components, 3 to 8 wt %, structural light-weight aggregates, 3 to 10 wt %, and zeolites or zealite vulcanite, 3 to 8 wt %.

* * * * *